(12) United States Patent
Lafly et al.

(10) Patent No.: US 8,720,823 B2
(45) Date of Patent: May 13, 2014

(54) AIRCRAFT STRUCTURAL ELEMENT LOCATED AT THE INTERFACE BETWEEN A WING AND THE FUSELAGE

(75) Inventors: Anne-Laure Lafly, Toulouse (FR); Franck Batalla, Toulouse (FR); Henri Leman, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 917 days.

(21) Appl. No.: 12/601,170

(22) PCT Filed: May 13, 2008

(86) PCT No.: PCT/FR2008/000662
§ 371 (c)(1),
(2), (4) Date: Nov. 20, 2009

(87) PCT Pub. No.: WO2008/152248
PCT Pub. Date: Dec. 18, 2008

(65) Prior Publication Data
US 2010/0170986 A1   Jul. 8, 2010

(30) Foreign Application Priority Data
May 23, 2007   (FR) ...................................... 07 55228

(51) Int. Cl.
*B64C 1/26*   (2006.01)
*B64C 3/18*   (2006.01)

(52) U.S. Cl.
USPC ..................... 244/123.1; 244/119; 244/131

(58) Field of Classification Search
USPC ................. 244/119, 120, 123.1, 123.3, 131
See application file for complete search history.

(56) References Cited

U.S. PATENT DOCUMENTS

| 2,116,953 | A | * | 5/1938 | Sambraus | 244/131 |
| 2,318,909 | A | * | 5/1943 | Woods | 244/123.1 |
| 2,367,750 | A | * | 1/1945 | Berkow et al. | 244/131 |
| 2,393,081 | A | * | 1/1946 | Watter | 244/131 |
| 2,396,625 | A | * | 3/1946 | Watter | 244/123.1 |
| 2,618,448 | A | * | 11/1952 | Robert | 244/123.7 |
| 3,499,622 | A | * | 3/1970 | Surcin et al. | 244/131 |
| 6,116,539 | A | * | 9/2000 | Williams et al. | 244/46 |
| 6,314,630 | B1 | * | 11/2001 | Munk et al. | 29/407.01 |

(Continued)

FOREIGN PATENT DOCUMENTS

| GB | 2 409 443 | 6/2005 |
| JP | 2000-512915 | 10/2000 |
| WO | 98 58759 | 12/1998 |

OTHER PUBLICATIONS

Niu, Michael "Airframe Structural Design", Conmilit Press, Ltd., Hong Kong, $2^{nd}$ Edition, ISBN 962-7128-09-0, p. 283, XP002461437, Feb. 2, 2002.

(Continued)

*Primary Examiner* — Tien Dinh
*Assistant Examiner* — Steven Hawk
(74) *Attorney, Agent, or Firm* — Oblon, Spivak, McClelland, Maier & Neustadt, L.L.P.

(57) ABSTRACT

An aircraft structural element situated at an interface between a wing and the fuselage, and including a web and profiled elements flanking the web. At least one the profiled element includes a flat part positioned without overlap in the continuation of a flat part of the web and connected thereto by a welded butt joint using friction stir welding.

13 Claims, 3 Drawing Sheets

(56) References Cited

U.S. PATENT DOCUMENTS

| | | | |
|---|---|---|---|
| 6,328,261 B1* | 12/2001 | Wollaston et al. | 244/119 |
| 6,450,394 B1* | 9/2002 | Wollaston et al. | 228/112.1 |
| 6,808,143 B2* | 10/2004 | Munk et al. | 244/131 |
| 7,234,668 B2* | 6/2007 | Wollaston et al. | 244/132 |
| 7,578,473 B2* | 8/2009 | Shortman | 244/123.1 |
| 7,641,147 B2* | 1/2010 | Schmidt et al. | 244/123.1 |
| 2001/0052561 A1* | 12/2001 | Wollaston et al. | 244/132 |
| 2003/0226935 A1* | 12/2003 | Garratt et al. | 244/123 |
| 2005/0116105 A1* | 6/2005 | Munk et al. | 244/123 |
| 2006/0054666 A1* | 3/2006 | Ehrstrom et al. | 228/227 |
| 2006/0145010 A1* | 7/2006 | Schmidt et al. | 244/123.8 |
| 2008/0265094 A1* | 10/2008 | Van Der Veen et al. | 244/123.1 |
| 2009/0189019 A1* | 7/2009 | Shortman | 244/123.1 |
| 2009/0272848 A1* | 11/2009 | Munday | 244/131 |
| 2009/0277011 A1* | 11/2009 | Shortman | 29/897.2 |
| 2010/0001133 A1* | 1/2010 | Kempa et al. | 244/118.6 |

OTHER PUBLICATIONS

Office Action issued Jan. 8, 2013 in Japanese Patent Application No. 2010-508874 (with English-language translation).

* cited by examiner

AIRCRAFT STRUCTURAL ELEMENT LOCATED AT THE INTERFACE BETWEEN A WING AND THE FUSELAGE

The invention relates to metal structural elements belonging to the central wing box of an airplane and more particularly to a structure and to a method for manufacturing and assembling such an element.

It is known that an airplane is traditionally provided with a fuselage and two opposite symmetric wings which are mounted and fixed on this fuselage. The junction of each of these wings to the fuselage is assured by way of a central wing box disposed inside the fuselage over its entire width. This box is generally provided with an upper panel and a lower panel parallel to one another and which absorb the lifting forces generated by the wings during flight. These two panels are fixed to one another by virtue of two spars, front and rear, which also absorb part of the lifting forces.

At the interface of the central wing box and each wing there is disposed a structural element that is traditionally made of aluminum alloy. It is composed of a vertically extending plane web and is embraced on its four sides by four profiled elements, upper, lower, front and rear.

The plane web is traditionally provided with several vertical stiffeners, which improve the resistance of the structural element to the large mechanical stresses that it must withstand.

The upper profiled element of the structural element is joined to the upper panel of the central wing box and to the upper skin of the wing. The lower profiled element of the structural element is joined to the lower panel of the central wing box and to the lower skin of the wing. The front profiled element of the structural element is joined to the front spar of the central wing box and to the front of the wing. Finally, the rear profiled element of the structural element is joined to the rear spar of the central wing box and to the rear of the wing.

Such a structural element can be obtained from different elements assembled with one other by entirely bolted or riveted junctions, thus resulting in the presence of numerous overlap zones. In addition to the risks of shearing of the bolts or rivets, this architecture imposes the drilling of holes in the elements to be assembled in order to fix these same bolts or rivets, in turn leading to an increase of weight and to fragility of the structural element. In addition, certain problems inherent to poor fixations may appear during the period of operation of the aircraft.

Another solution consists in making the structural element from a single machined metal block, in order to improve the mechanical strength and to eliminate certain disadvantages due to the presence of junctions between different elements. This solution, described in particular in the application GB 2409443, is not used in practice because of its high cost price, which is due to the quantity of metal necessary and to the numerous machining operations to be performed.

Furthermore, such a structural element may suffer from distortion problems caused by the deformations to which the metal block is subjected during the machining step.

The invention relates to such a structural element that has improved performances while being simple, convenient and economical to manufacture.

To this end it proposes an aircraft structural element located at the interface between a wing and the fuselage, provided with a web and with profiled elements embracing the said web, characterized in that at least one said profiled element is provided with a flat part disposed without overlap in the extension of a flat part of the said web and connected thereto by a friction-stir-welded butt-type seam (in English: friction stir butt welding).

The absence of overlap at the joint between the web and the peripheral profiled elements achieves a substantial improvement of the mechanical strength of the structural element, assuring in particular better transmission of forces and a reduction of distortions.

In addition, the resulting disappearance of fixation rivets or bolts makes it possible to increase the level of safety by eliminating the shear forces that formerly acted on these parts.

Furthermore, the reduction of the quantity of material necessary leads to non-negligible weight savings on the order of 5%.

According to preferred characteristics of the structural element:
  the said welded seam is curved;
  the said welded seam is straight;
  the said web is provided with at least one side on which the said welded seam extends without interruption over a length at least equal to 95% of the length of the said side;
  the said profiled element is provided with, in addition to a first fin forming the said flat part, a second fin and a third fin, each skirting the said first fin facing the said welded seam, the said second fin and third fin being disposed on opposite sides of the said first fin;
  the said profiled element is provided with, in addition to the said first, second and third fins, a fourth fin disposed opposite the said first fin;
  at least one of the said second and third fins of the said profiled element is provided with a portion whose width varies in regular manner;
  at least one of the said second and third fins of the said profiled element is provided with a crenellated portion, each solid member of which is composed of two fingers joined side-by-side;
  at least one of the said second and third fins of the said profiled element is provided with a narrower portion;
  the said web is provided on at least one face with a portion projecting relative to the said flat part;
  the said web is provided on each side with a said flat part extending over the entire length of this side;
  the said web has overall rectangular shape and is at least two times as long as it is wide;
  the said web and the said profiled element are made of the same lithium-containing aluminum alloy; and/or
  the said web and the said profiled element are made of different aluminum alloys.

The disclosure of the invention will now be continued by the detailed description of a preferred exemplary embodiment, provided hereinafter by way of illustration but not limitation, with reference to the attached drawings, on which:

Figure 1:
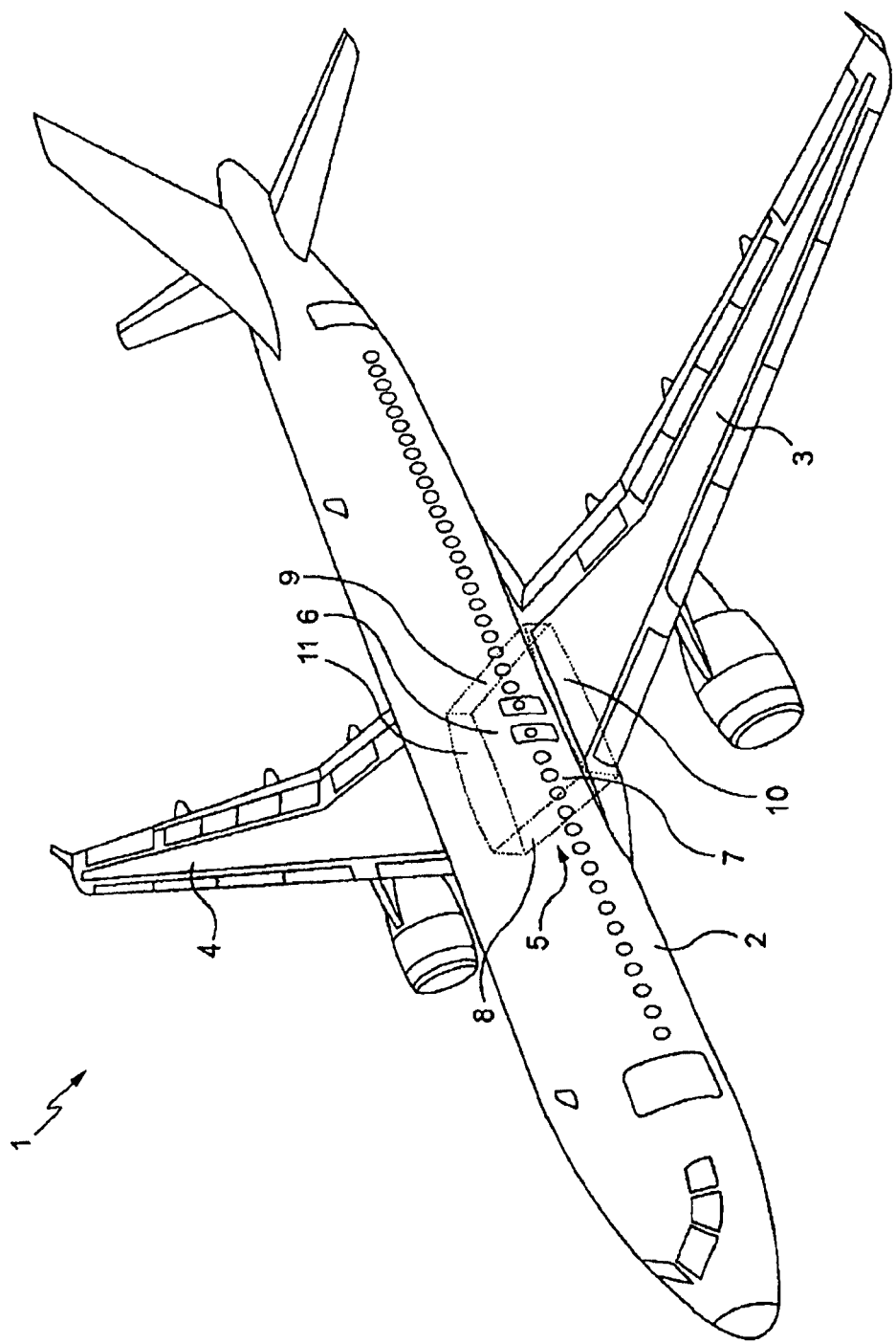
FIG. 1 shows a perspective view of an airplane, on which a structural element according to the invention, located at the interface between the fuselage and a wing, has been illustrated by dotted lines.

Airplane 1 illustrated on FIG. 1 is provided with a fuselage 2, which has overall oval shape and from which two symmetric wings 3 and 4 extend at the median part. Inside fuselage 2, a central wing box 5 makes it possible to assure fixation of wings 3 and 4 to fuselage 2.

Box 5 is provided with an upper panel 6 and a lower panel 7, parallel to one another and oriented horizontally. The two panels 6 and 7 are fixed by virtue of two parallel and vertical front and rear spars 8 and 9 respectively. At its two interfaces with wings 3 and 4, box 5 also comprises two structural elements 10 and 11, symmetric in that structural element 10 is fixed to wing 3 while element 11 is fixed to wing 4. These two structural elements 10 and 11 extend vertically between the two panels 6 and 7 and longitudinally between the two front and rear spars 8 and 9 respectively.

Such a structural element 10 will now be described in detail on the basis of FIGS. 2 to 5. Structural element 10 is provided with a web 20 made of a lithium-containing aluminum alloy. The incorporation of lithium, which has lower density than aluminum, achieves a weight savings on the order of 5% while also improving the weldability and tolerance to damage.

The contour of web 20 is overall rectangular and has two parallel straight portions which are connected by two outwardly convex portions. This web 20 is provided at the periphery with four coplanar flat parts 21, 22, 23 and 24, each extending over the entire length of a respective side.

Hereinafter part 21 (respectively part 22) located in proximity to upper panel 6 (respectively lower panel 7) is referred to as upper part 21 (respectively lower part 22).

Similarly, part 23 (respectively part 24) located in proximity to front spar 8 (respectively rear spar 9) is referred to as front part 23 (respectively rear part 24).

Figure 3:
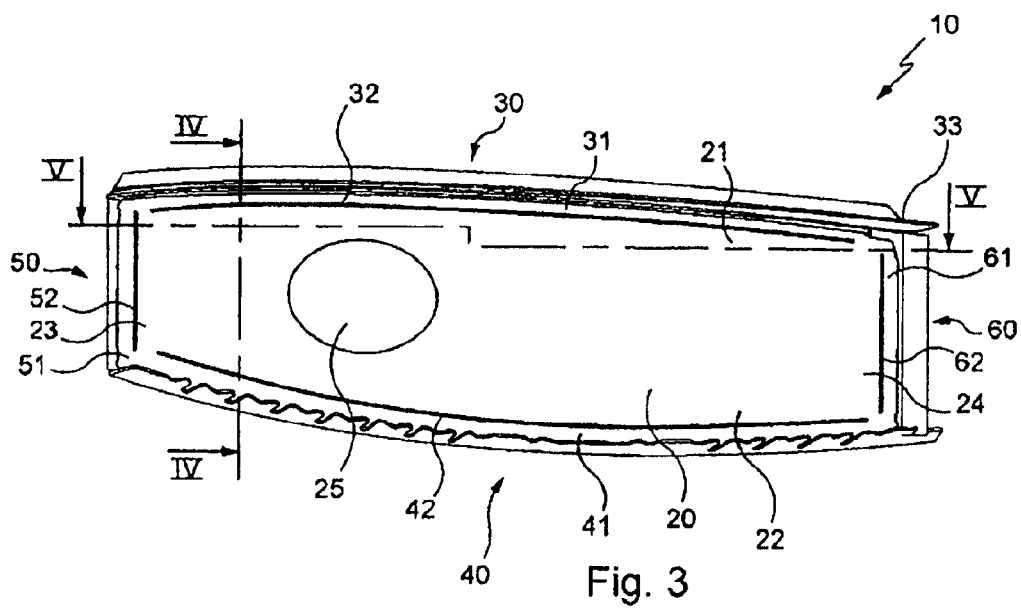
FIG. 3 shows a view in elevation of the structural element of FIG. 2.
Figure 4:
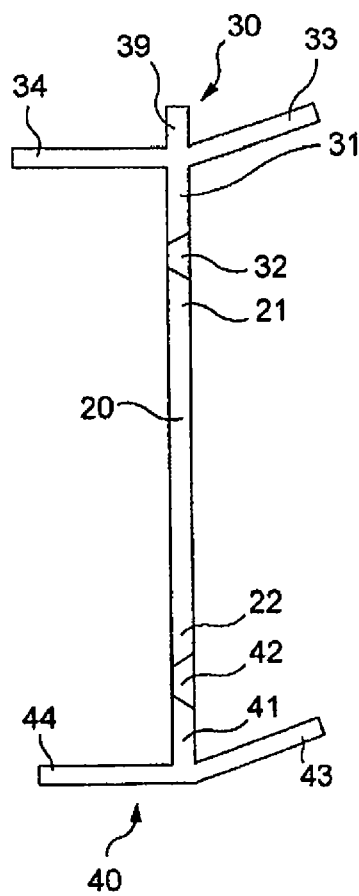
FIG. 4 shows a section of this structural element in plane IV-IV of FIG. 3.
Figure 5:
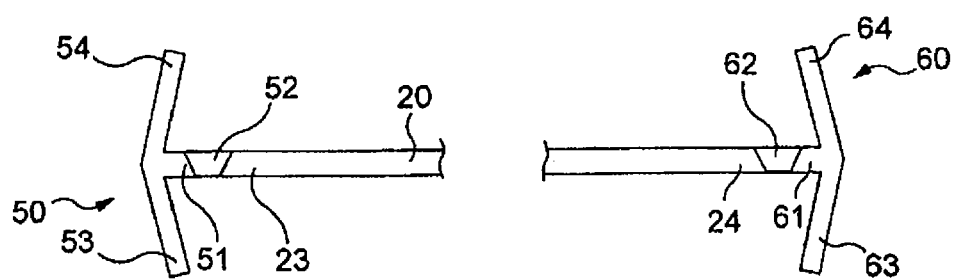
FIG. 5 shows a section of this structural element in plane V-V of FIG. 3.

In the preferred embodiment of the invention, this web 20 has a ratio of approximately 4 to 1 between length and width (see FIG. 3). More generally, web 20 is at least twice as long as it is wide.

A horizontally oriented oval opening 25 is disposed at mid-height of web 20 in its front half. Web 20 is also provided on a first face 26 with three metal stiffeners 27, which extend vertically over its entire height.

First stiffener 27 is located in proximity to front part 23, second stiffener 27 being disposed symmetrically relative to the first with respect to opening 25. Third stiffener 27 in turn is located in proximity to rear part 24.

These three stiffeners 27 project transversely relative to the plane in which the four parts 21, 22, 23 and 24 extend. The presence of these stiffeners 27 assures better strength in flat parts 21, 22, 23 and 24 and more generally in web 20 as a whole.

The second face of central web 20 (not visible on the drawings) has five metal frame feet, which are disposed vertically on opposite sides of opening 25.

Structural element 10 is also provided with four elements 30, 40, 50 and 60, which border the four sides of web 20. In the preferred embodiment, these elements 30, 40, 50 and 60 are made of the same aluminum alloy as web 20. However, depending on constraints and needs of each of these elements 30, 40, 50 and 60, they may be obtained from aluminum alloys different from that constituting web 20. That makes it possible to optimize the cost and weight of structural element 10 by choosing, for each element constituting it, the material that is most appropriate depending on the constraints and needs.

First element 30, which borders the upper side of web 20, is overall profiled in slightly inwardly curved direction and has a transverse section that varies slightly from its front end to its rear end. Profiled element 30 is provided with a first flat fin 31, which is disposed without overlap in the extension of upper part 21 and is connected thereto by an inwardly curved friction-stir-welded butt-type seam 32. Welded seam 32 extends without interruption over a length at least equal to 95% of the length of the upper side of web 20, albeit without reaching its two front and rear ends.

Profiled element 30 is also provided with a slightly convex second fin 33 and third fin 34, disposed on opposite sides of first fin 31. These fins 33 and 34 are rooted all along the inwardly curved end of fin 31 located facing welded seam 32. A fourth flat fin 39 is disposed in the extension of first fin 31.

In section (see FIG. 4), fin 33 has an edge, which extends slightly obliquely toward the edge of fin 39 and in the direction of the upper skin of wing 3, to which fin 33 is attached.

The edge of fin 34 extends opposite the edge of fin 33, perpendicular to the edge of fin 31 and in the direction of structural element 11.

This relative positioning of the edges belonging to fins 33 and 34 remains unchanged for each section considered along a plane parallel to plane IV-IV.

Figure 2:
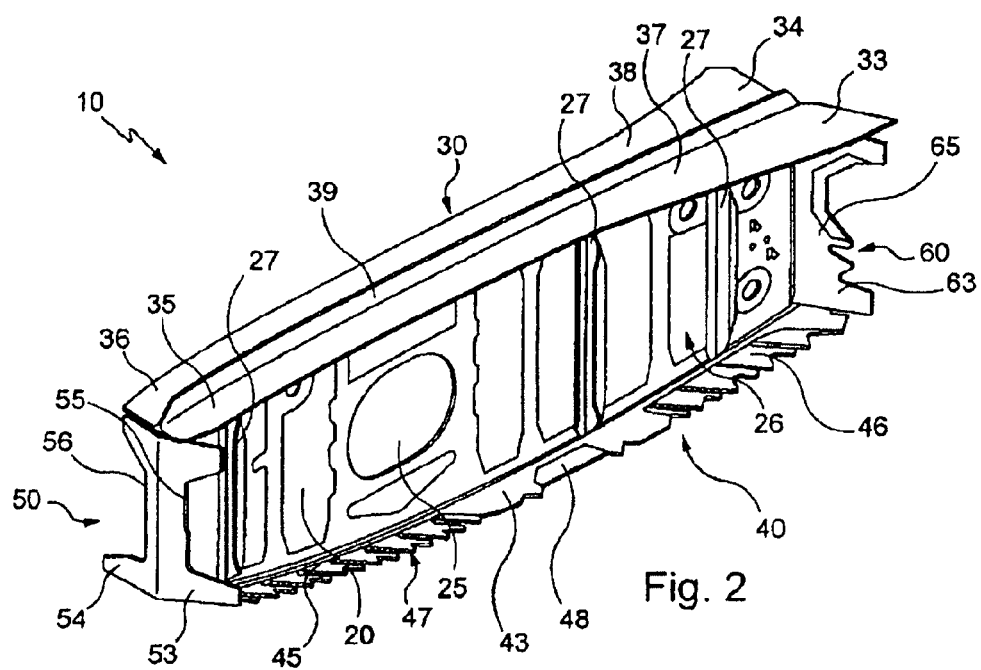
FIG. 2 shows a perspective view of a central wing box structural element according to the invention.

As can be seen on FIG. 2, fin 33 is provided on its first front two thirds with a first portion 35 of substantially constant width (considered in the direction from central box 5 toward wing 3). Fin 33 is extended by a second portion 37, whose width increases regularly up to its rear end.

Similar overall to fin 33, fin 34 is also provided on its first front two thirds with a first portion 36 of substantially constant width (considered in the direction from central box 5 toward wing 3). Wing 34 is extended by a second portion 38, whose width increases regularly up to its rear end.

Having constant width (considered in the direction from element 40 toward element 30) substantially equivalent to that of fin 31, fin 39 has a free border with the same curvature as that of welded seam 32.

Second element 40, which borders the lower side of web 20, is overall profiled in a slightly inwardly curved direction. Profiled element 40 is provided with a first flat fin 41 of constant width (considered in the direction from element 40 toward element 30), which is disposed without overlap in the extension of lower part 22 and connected thereto by inwardly curved friction-stir-welded butt-type seam 42. Welded seam 42 extends without interruption over a length at least equal to 95% of the length of the lower side of web 20, albeit without reaching its two front and rear ends.

Profiled element 40 is also provided with a convex second fin 43 and third fin 44, disposed on opposite sides of first fin 41. These fins 43 and 44 are rooted all along the inwardly curved end of fin 41 located facing welded seam 42.

In section (see FIG. 4), fin 43 has an edge, which extends slightly obliquely toward the edge of fin 41 and in the direction of the end of wing 3.

The edge of fin 44 extends opposite the edge of fin 43, perpendicular to the edge of fin 41 and in the direction of structural element 11.

This relative positioning of the edges belonging to fins 43 and 44 remains unchanged for each section considered along a plane parallel to plane IV-IV.

As can be seen on FIG. 2, fin 43 is provided with two crenellated front and rear portions 45 and 46 respectively. Each solid member 47, which has an M-shaped contour, is composed of two identical fingers joined side-by-side. Front and rear portions 45 and 46 are separated by a central portion 48, which has an overall straight free edge interrupted in the first and second thirds of its length by a pair of saw-type teeth.

Similar overall to fin 43, fin 44 (not visible on FIG. 2) is also provided with two crenellated front and rear portions, wherein each solid member, which has an M-shaped contour, is composed of two identical fingers joined side-by-side.

These crenellated portions facilitate fixation of the structural element to the other components of the aircraft (central wing box and wing).

Third element 50, which borders the front side of web 20, is profiled in straight direction. Profiled element 50 is provided with a first flat fin 51 of constant width (considered in the direction from element 50 toward element 60), which is disposed without overlap in the extension of front part 23 and connected thereto by a straight friction-stir-welded butt-type seam 52. Welded seam 52 extends without interruption over a length at least equal to 95% of the length of the front side of web 20, albeit without reaching its two front and rear ends.

Profiled element 50 is also provided with a second fin 53 and third fin 54, disposed on opposite sides of first fin 51. These fins 53 and 54 are rooted all along the straight end of fin 51 located facing welded seam 52.

In section (see FIG. 5), fins 53 and 54 have edges forming a widely flared V turned toward web 20 and whose apex is located at the junction of the three edges of fins 51, 53 and 54.

The edge of fin 53 extends in the direction of the front of wing 3, to which fin 53 is attached.

The edge of fin 54 extends in the direction of the front spar 8 of central box 5, to which fin 54 is attached.

This relative positioning of the edges belonging to fins 53 and 54 remains unchanged for each section considered along a plane parallel to plane V-V.

As can be seen on FIG. 2, fin 53 is provided with an embrasure defining a narrower central portion 55, which runs over approximately two thirds of fin 53 and has an overall straight profile parallel to welded seam 52.

Similar overall to fin 53, fin 54 is also provided with a narrower central portion 56 which runs over approximately two thirds of fin 54 and has an overall straight profile parallel to welded seam 52.

Fourth element 60, which borders the rear side of web 20, is profiled in straight direction. Profiled element 60 is provided with a first flat fin 61 of constant width (considered in the direction from element 50 toward element 60), which is disposed without overlap in the extension of rear part 24 and connected thereto by a straight friction-stir-welded butt-type seam 62. Welded seam 62 extends without interruption over a length at least equal to 95% of the length of the front side of web 20, albeit without reaching its two upper and lower ends.

Profiled element 60 is also provided with a flat second fin 63 and third fin 64, disposed on opposite sides of first fin 61. These fins 63 and 64 are rooted all along the straight end of fin 61 located facing welded seam 62.

In section (see FIG. 5), fins 63 and 64 have edges forming a widely flared V turned toward web 20 and whose apex is located at the junction of the three edges of fins 61, 63 and 64.

The edge of fin 63 extends in the direction of the rear of wing 3, to which fin 63 is attached.

The edge of fin 64 extends in the direction of the rear spar 9 of central box 5, to which fin 64 is attached.

This relative positioning of the edges belonging to fins 63 and 64 remains unchanged for each section considered along a plane parallel to plane V-V.

As can be seen on FIG. 2, fin 63 is provided with embrasures defining a narrower central portion 65 which runs over two thirds of fin 63 and has a non-homogeneous profile.

This profile has a first straight upper portion parallel to welded seam 62 which is extended by a second saw-toothed portion.

Similar overall to fin 63, fin 64 (not visible on FIG. 2) is also provided with a narrower central portion which runs over two thirds of fin 64 and has a non-homogeneous profile similar to that of embrasure portion 65.

Preferably inwardly curved welded seams 32 and 42 and straight welded seams 52 and 62 follow (or conform to) the contour of web 20. In the present case, however, these four seams 32, 42, 52 and 62 are not joined at the corners of web 20.

To manufacture such a structural element 10, each of the four profiled elements 30, 40, 50 and 60 is first positioned around web 20 in such a way that fin 31 (respectively 41, 51 and 61) of profiled element 30 (respectively 40, 50 and 60) is located in the same plane and is in butt-to-butt relationship with flat part 21 (respectively 22, 23 and 24) of web 20, in this way forming a joint line.

Each profiled element 30, 40, 50 and 60 is friction-stir-welded together with web 20 along the corresponding joint line, in order to plasticize the metal in the weld zone.

The replacement of bolting and/or riveting operations by a simple welding operation simplifies the method of manufacturing structural element 10 and assures a non-negligible reduction of costs and of the production cycle.

In a variant not illustrated, one or more of the elements such as 30, 40, 50 and 60 are profiled differently, for example in a straight direction, with weld seams such as 32, 42, 52 and 62, which are also straight.

In another variant not illustrated, structural element 10 is provided with a different number of profiled elements at the periphery of web 20, and/or these elements have different shapes and contours. For example:

structural element 10 is provided with only two profiled upper and lower elements, such as 30 and 40 respectively, or else with only two profiled front and rear elements, such as 50 and 60 respectively; and/or element 10 is provided with a plurality of profiled elements along the same side of web 20, for example disposed at regular intervals along the upper and lower sides and each provided with a flat second fin and third fin disposed in the same plane transverse to that of a flat part of web 20.

In yet another variant not illustrated, web 20 is replaced by a web having a different configuration. For example:

the web such as 20 is provided with a different number of stiffeners such as 27 and/or with frame feet, and these are disposed in a direction that is also different; and/or the web such as 20 is solid and therefore does not have any opening such as 25.

The invention claimed is:

1. An aircraft structural element of a central wing-box, the aircraft structural element comprising:
    a web with a longitudinal direction and a transverse direction; and
    at least one longitudinal profiled element that borders the web and that connects to the wing-box and to the wing, the at least one longitudinal profiled element including
        a first flat fin coplanar with and abutting a flat part of the web and connected thereto by a friction-stir-welded butt-type seam,
        a second fin on a first side of the first fin, and
        a third fin on a second side of the first fin opposite the first side of the first fin,
    wherein at least one of the second and third fins includes a portion with a projected width in a plane perpendicular to the longitudinal direction which increases continuously or decreases continuously along the longitudinal direction, and
    wherein the aircraft structural element is located at an interface between a wing and a fuselage of said aircraft.

2. An element according to claim 1, wherein the friction-stir-welded butt-type seam is curved.

3. An element according to claim 1, wherein the friction-stir-welded butt-type seam is straight.

4. An element according to claim 1, wherein the web includes at least one side on which the friction-stir-welded butt-type seam extends without interruption over a length at least equal to 95% of the length of the at least one side.

5. An element according to claim 1, wherein the second fin and third fin skirt the first fin facing the friction-stir-welded butt-type seam, and the second and third fins are not coplanar.

6. An element according to claim 5, wherein the profiled element includes, a fourth fin disposed opposite the first fin.

7. An element according to claim 5, wherein at least one of the second and third fins of the profiled element includes a portion whose projected width in a plane perpendicular to the longitudinal direction varies linearly along the longitudinal direction.

8. An element according to claim 5, wherein at least one of the second and third fins of the profiled element includes a crenellated portion, each crenellated portion with a solid member including two fingers joined side-by-side.

9. An element according to claim 5, wherein the web includes at least one face with a portion projecting in a plane not coplanar with the flat part of the web.

10. An element according to claim 1, wherein the web includes on each side a flat part extending over the entire length of each side.

11. An element according to claim 1, wherein the web has an overall rectangular shape and is at least two times as long as it is wide.

12. An element according to claim 1, wherein the web and the at least one profiled element are made of the same lithium-containing aluminum alloy.

13. An element according to claim 1, wherein the web and the at least one profiled element are made of different aluminum alloys.

* * * * *